United States Patent

Tanaka

[11] Patent Number: 5,848,040
[45] Date of Patent: *Dec. 8, 1998

[54] DATA REPRODUCING APPARATUS AND METHOD

[75] Inventor: Shinichi Tanaka, Kamakura, Japan

[73] Assignee: Nikon Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 794,787

[22] Filed: Feb. 3, 1997

[30] Foreign Application Priority Data

Feb. 5, 1996 [JP] Japan .................................. 8-018727

[51] Int. Cl.$^6$ ........................................................ G11B 7/00
[52] U.S. Cl. ............................ 369/59; 369/124; 369/47; 360/48
[58] Field of Search ................................ 369/59, 47, 48, 369/49, 50, 54, 58, 32, 124, 60; 360/48, 51

[56] References Cited

U.S. PATENT DOCUMENTS

| | | |
|---|---|---|
| 5,258,933 | 11/1993 | Johnson et al. . |
| 5,345,342 | 9/1994 | Abbott et al. . |
| 5,363,352 | 11/1994 | Tobita et al. ........................... 369/47 X |
| 5,400,189 | 3/1995 | Sato et al. . |
| 5,406,427 | 4/1995 | Shimoda . |
| 5,455,813 | 10/1995 | Hayashi .................................... 369/59 |
| 5,506,827 | 4/1996 | Tobita ...................................... 369/59 |
| 5,563,864 | 10/1996 | Kobayashi et al. ................... 369/48 X |

FOREIGN PATENT DOCUMENTS

A-5-6620  1/1993  Japan .

*Primary Examiner*—Muhammad N. Edun
*Attorney, Agent, or Firm*—Oliff & Berridge, PLC

[57] ABSTRACT

When performing data reproduction based on the partial response method, a reference pattern detection circuit detects the reference pattern directly from the reproduced signal that is supplied from a low pass filter, and supplies a timing signal to a calculation circuit. Based on the timing signal, the calculation circuit determines threshold levels that are used for data decoding in a decoder circuit based on the output level of an A/D converter circuit. As a result, a sector mark, which previously was used as a reference mark for reference pattern detection, does not need to be provided in the recording medium, thereby increasing the recording capacity for user data.

27 Claims, 5 Drawing Sheets

DATA REPRODUCING APPARATUS AND METHOD

BACKGROUND OF THE INVENTION

1. Field of the Invention

This invention relates to data reproducing apparatus used, for example, in magnetooptical disk apparatus, and to methods of reproducing data recorded on, for example, a magnetooptical disk.

2. Description of Related Art

Generally, a partial response (PR) method is used for recording data in a recording medium such as, for example, a magnetic disk or a magnetooptical disk. If data is recorded with, for example, a PR (1,1) method, which is one type of PR method, then the signal obtained during reproduction of the recorded data will have three values, "0", "1", and "2".

When reproducing the recorded data, a timing signal is output from a PLL circuit based on a clock signal that is synchronized with the reproduced signal. Based on this clock signal, the reproduced signal is converted from analog to digital data, thereby obtaining the reproduced data represented by the three values mentioned above.

One type of data reproducing apparatus based on the partial response method is disclosed in, for example, Japanese Laid-Open Patent Application No. 5-6620.

The recording medium, such as a magnetooptical disk, used in this type of data recording/reproduction apparatus, has a format shown in FIG. 6. In the figure, the recording medium has, in order from its leader portion, a sector mark area 60, a VFO area 61, which is a reproduction PLL entrance area used by the PLL circuit for generating a clock signal from the reproduced signal, a reference pattern area 62, an AM area 63 in which an address mark is recorded, an ID area 64, a gap area 65, a VFO area 66, a reference pattern area 67, a SYNC area 68 indicating the data start point, and a user data area 69.

When reproducing the data, the reference pattern recorded in the reference pattern area is reproduced first to determine the threshold levels required for decoding the data, and then, data recorded in the subsequent areas, such as an ID area 64, or a user data area 69, is decoded based on the determined threshold levels.

Conventionally, the reference pattern recorded in the reference pattern area is detected based on a reference mark signal. More particularly, a conventional apparatus has a sector mark detection circuit 71 and a timing generation circuit 72, as shown in FIG. 7. When the sector mark detection circuit 71 detects the sector mark on the sector mark area 60 from the reproduced signal, a sector mark detection signal is generated at a timing shown in FIG. 6. Then, the timing generation circuit receives the sector mark detection signal and outputs a timing signal at the reproduction start points of the reference pattern recorded in the reference pattern areas 62 and 67, as also shown in FIG. 6. This timing signal serves as the reference mark signal mentioned above.

Such a conventional structure has a problem in that the recording medium must include the area 60 for recording the sector mark, which limits the amount of user data recording area on the recording medium.

SUMMARY OF THE INVENTION

One object of disclosed embodiments of the present invention is to increase the recording capacity for user data on a recording medium by locating (i.e., detecting) the reference pattern data (used to determine the threshold level and to reproduce the data) accurately without using a mark, such as a sector mark, that functions as a positional reference for the reference pattern data.

In order to achieve the above and other objects, a reference pattern detection circuit is provided in a data reproduction apparatus that includes a PR equalization circuit for equalizing a reproduced signal of user data recorded on a disk type recording medium based on the partial response method. The reference pattern detection circuit receives the reproduced signal from the recording medium and detects a reference pattern that is then used to determine a plurality of threshold levels, which subsequently are used to decode sample data. The reference pattern detection circuit outputs a signal to a calculation circuit. Using this output signal, the calculation circuit determines the plurality of threshold levels from the output of an A/D converter circuit. The determined threshold levels are supplied by the calculation circuit to a decoder circuit, which then decodes the sample data according to any one of a number of known processes. The A/D converter circuit samples the output signal from the PR equalization circuit and produces the sample data based on a clock signal produced from the output signal of the PR equalization circuit.

By using this structure, particularly the reference pattern detection circuit, the reference pattern is detected directly from the reproduced signal without using a sector mark detection signal. The threshold levels then are determined based on the reference pattern detection signal. The reference pattern detection circuit detects the reference pattern only from the signal reproduced from the reference pattern area on the recording medium. No information from any of the other areas on the recording medium is required.

As has been described above, the reference pattern on the recording medium is directly detected from the reproduced signal, and a plurality of threshold levels that are used to decode the sample data are determined based on the reference pattern detection signal. In other words, the reference pattern used for determining a plurality of threshold levels can be detected without a sector mark. Since it is not necessary to provide the sector mark area on the recording medium, the recording capacity for user data can be increased.

Furthermore, because the reference pattern detection circuit can detect the reference pattern from only the reproduced signal from the reference pattern area on the recording medium, error operations of the apparatus can be avoided during data reproduction, which may be caused when a pattern similar to the reference pattern exists in other areas on the recording medium.

BRIEF DESCRIPTION OF THE DRAWINGS

The invention will be described in conjunction with the following drawings in which like reference numerals designate like elements and wherein.

DETAILED DESCRIPTION OF PREFERRED EMBODIMENTS

One embodiment of the present invention will be described in detail with reference to the drawings.

Figure 1:
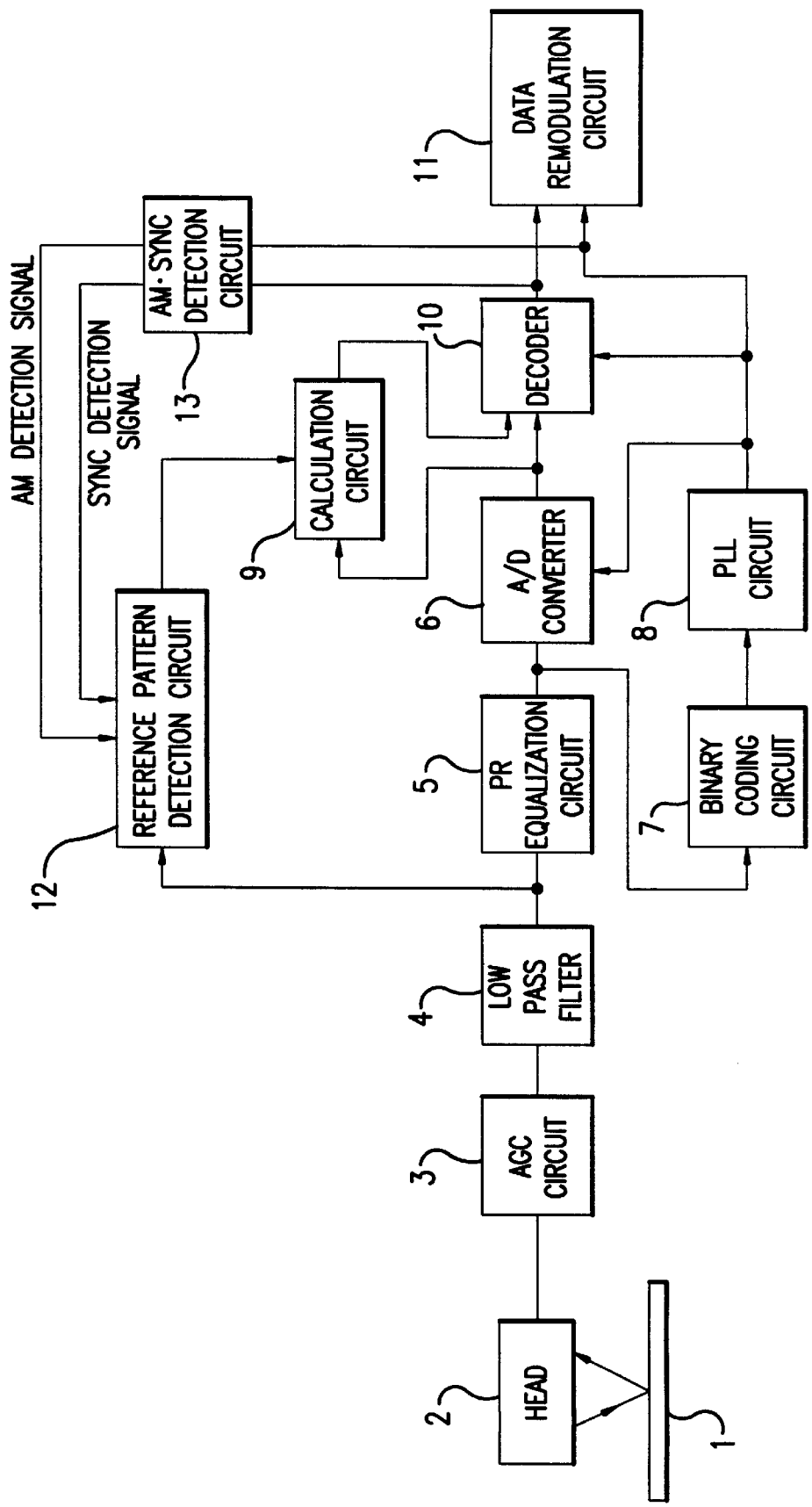
FIG. 1 is a block diagram showing the structure of a data reproducing apparatus according to one embodiment of the invention.

FIG. 1 is a block diagram of an embodiment of a data reproducing apparatus of the invention. The data reproducing apparatus includes a recording medium 1, such as, for example, a magnetooptical disk, and a head 2 that emits a laser beam onto the recording medium 1, receives the reflected light, and performs photoelectric conversion to output a reproduced signal. An AGC circuit 3 receives the reproduced signal from the head 2, and absorbs the dispersion of the reproduced signal amplitude caused by differences in the reflectivity of the recording medium 1.

A low pass filter 4 reduces noise in the high frequency band out of the proper frequency band of the reproduced signal. The PR equalization circuit 5, which serves as a transversal filter, equalizes the waveform of the reproduced signal waveform so that it becomes a partial response (PR) waveform. The data reproduction apparatus further includes an A/D converter circuit 6, a binary coding circuit 7, a PLL (Phase Lock Loop) circuit 8, a calculation circuit 9, a decoder circuit 10, and a data demodulation circuit 11. A reference pattern detection circuit 12 detects the reference pattern of the reference areas 62 and 67 recorded on the recording medium 1. An AM/SYNC detection circuit 13 detects the address mark on the AM area 63 and the SYNC data on the SYNC area 68.

There will be a brief explanation of a partial response (PR) processing method used in the PR equalization circuit 5 for a better understanding of the invention, exemplifying a PR (1,1) method, which is one type of known PR method.

Figure 2A:
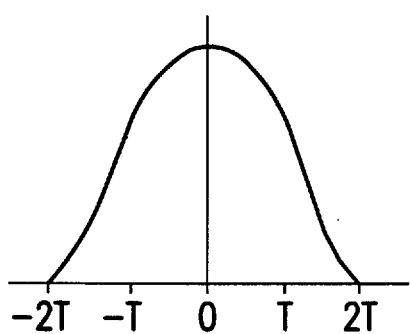
FIGS. 2A–2E show the waveform of the signal reproduced by the data reproducing apparatus of one embodiment of the invention.
Figure 2B:
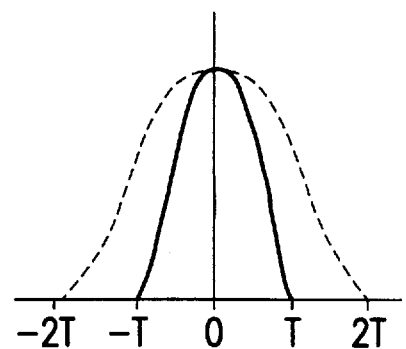

Generally, the signal waveform obtained through the reproduction head 2 becomes slightly dull due to the restriction on the lens resolution, as compared with the waveform (rectangular waveform) of the signal written in the recording medium. When the recording density increases, an interference occurs among codes, in which the waveform to be read at a given time period interferes with the waveform to be read at another time period. This situation is shown in FIG. 2A. (T represents a readout clock period during data reproduction.) The interference among codes causes an error in data detection. To remove the interference among codes, a transversal filter is used to make the waveform more narrow as shown in FIG. 2B. However, this operation results in emphasizing the high frequency component, and as a result, noise increases, causing the S/N (signal-to-noise) ratio to deteriorate.

Figure 2C:
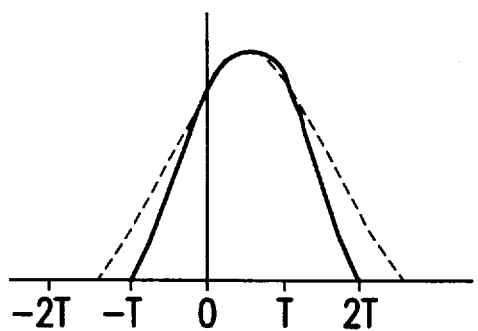
Figure 3:
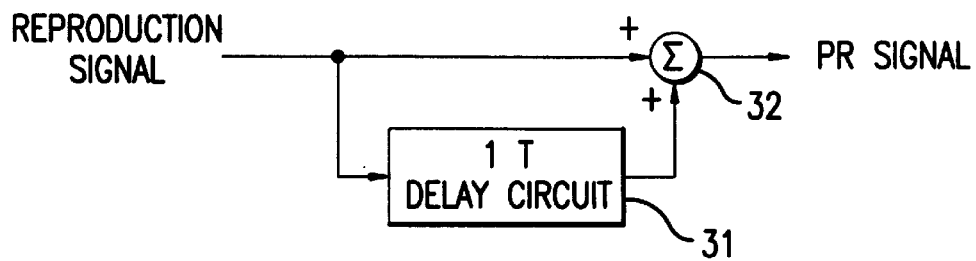
FIG. 3 is a block diagram of a PR equalization circuit for data reproduction included in a data reproducing apparatus of one embodiment of the invention.

In the PR (1,1) method, interference is caused deliberately between codes during waveform equalization by a known technique, using a 1 T delay circuit 31 and an adder 32, as shown in FIG. 3. As a result, the waveform shown by the broken line in FIG. 2C becomes the one shown in solid line in FIG. 2C, and the amount of width reduction of the waveform is diminished. Emphasis on the high frequency component is also reduced, and deterioration in the S/N ratio is suppressed.

Figure 2D:
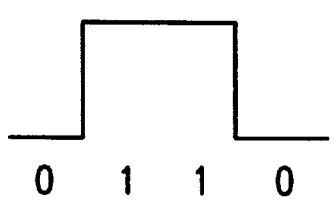
Figure 2E:
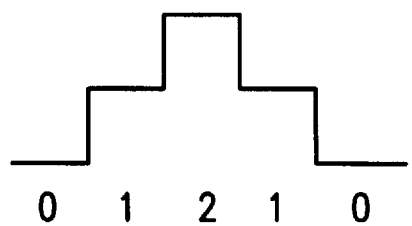

As for the data, "0110" data in the NRZ method (FIG. 2D) is converted to "01210" data shown in FIG. 2E through the PR (1,1) method as is known in the art.

Therefore, the PR (1,1) method requires a tri-value code determination circuit and a decoder circuit 10 for decoding the data to the original binary code, which will be described below.

Binary coding circuit 7 converts the reproduced signal having a waveform equalized by the PR equalization circuit 5 to binary codes. The converted code is supplied from the binary coding circuit 7 to the PLL circuit 8. PLL circuit 8 receives the reproduced binary signal, and extracts the clock signal synchronized with the reproduction signal, which is then output to the A/D converter circuit 6. The A/D converter circuit 6 converts the equalized reproduction signal output from the PR equalization circuit 5 into a digital form based on the timing of the clock signal output from the PLL circuit 8. The digital signal from the AID converter circuit 6 is supplied to the calculation circuit 9 and to the decoder circuit 10.

Calculation circuit 9 receives the output signal from AID converter circuit 6, and a timing signal from the reference pattern detection circuit 12, the details of which will be described below. Using the timing signal as a trigger, the calculation circuit 9 determines the threshold levels for tri-value coding based on the AID converted value of the reference pattern. That is, when the timing signal output by the reference pattern detection circuit 12 has a condition indicating that the reproduction of data from the reference pattern area is occurring, the maximum and minimum levels of this data (the signal output from the A/D converter circuit 6) are detected by calculation circuit 9, which then calculates the difference between the maximum and minimum levels and equally divides this difference into three. The levels dividing the difference between the maximum and minimum into three become threshold levels. (Therefore, two threshold levels are determined.) Decoder circuit 10 detects the three values of the signal output from the A/D converter circuit 6, using the output levels (threshold levels) from the calculation circuit 9 as a reference, and converts the tri-value data into a binary signal.

The binary signal is supplied to the data demodulation circuit 11, in which the binary data is demodulated based on the clock signal from PLL circuit 8. The binary signal is also supplied to AM/SYNC detection circuit 13. The AM/SYNC detection circuit 13 detects the address mark and SYNC data from the binary signal, based on the clock signal from PLL circuit 8, and outputs an AM detection signal and a SYNC detection signal.

Figure 4:
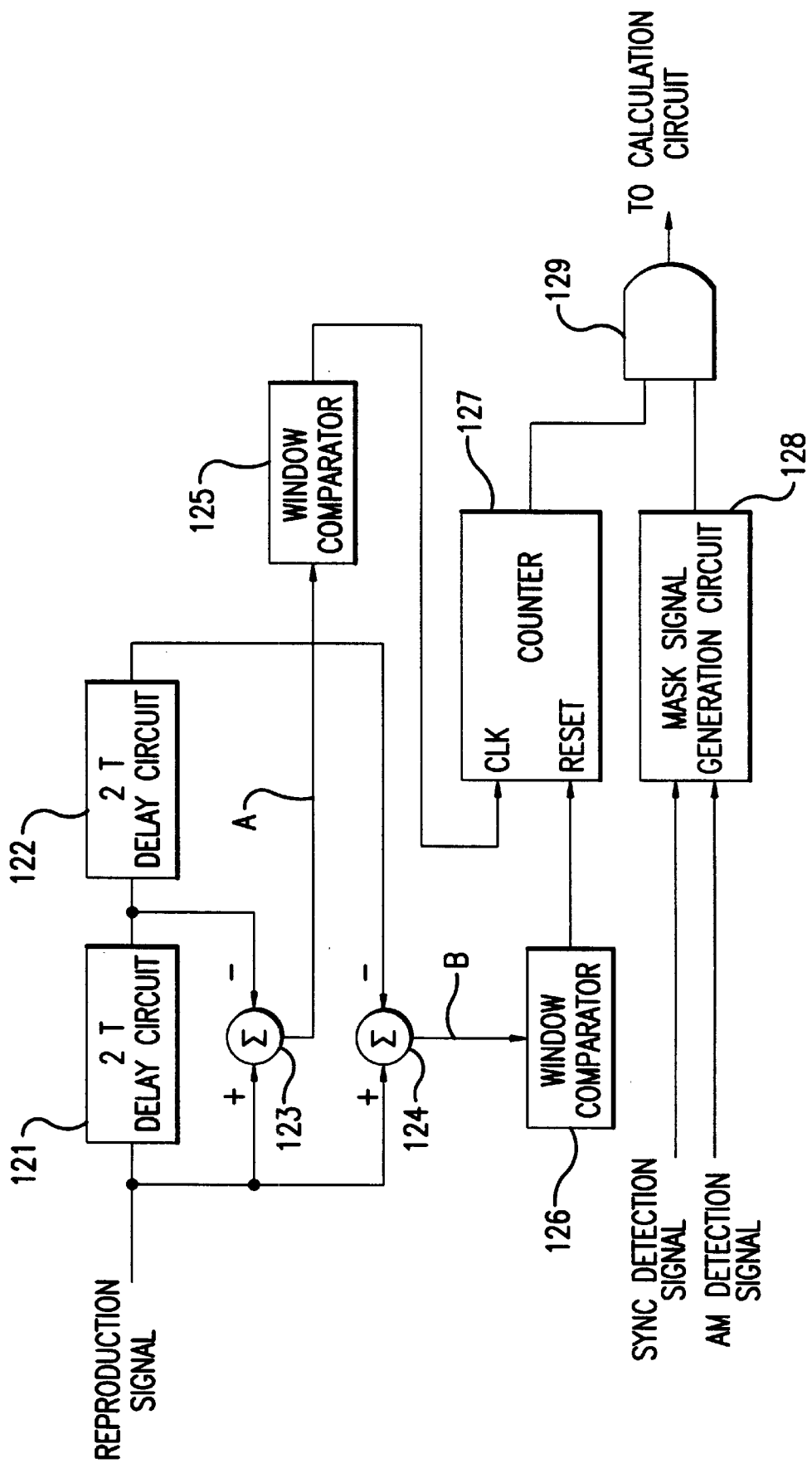
FIG. 4 is a block diagram of a reference pattern detection circuit that is a main part of a data reproducing apparatus of one embodiment of the invention.
Figure 6:
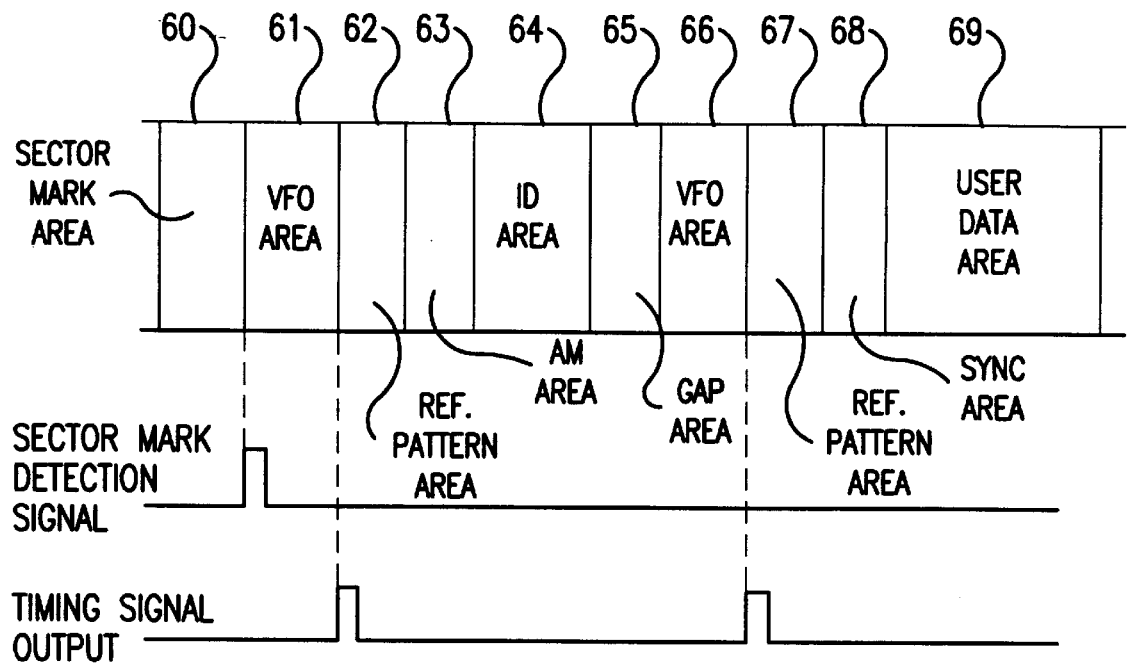
FIG. 6 shows the format of a recording medium used in a conventional apparatus, and the output timing of signals based on that format during data reproduction.
Figure 7:
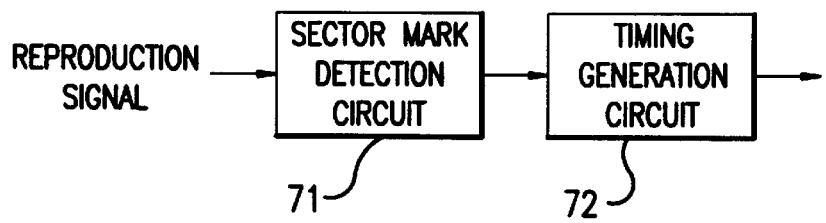
FIG. 7 is a block diagram of the structure of the data reproduction timing circuit in a conventional apparatus.

FIG. 4 is a block diagram of one embodiment of the reference pattern detection circuit 12, which is the main part of the present invention. Reference pattern detection circuit 12 includes 2 T delay circuits 121 and 122, subtracters 123 and 124, window comparators 125 and 126, a counter 127, a mask signal generation circuit 128, and an AND circuit 129. In this circuit, the known 1–7 modulation technique is used together with the PR (1,1) partial response technique.

Assuming that T is a readout clock period of the reproduction signal obtained through low pass filter 4, the reference pattern reproduced from the reference pattern areas 62 and 67 will be a repeating pattern having a frequency of 2 T. The reference pattern detection circuit 12 detects the reference pattern directly from the reproduced signal obtained from low pass filter 4, in the manner described below.

Figure 5A:
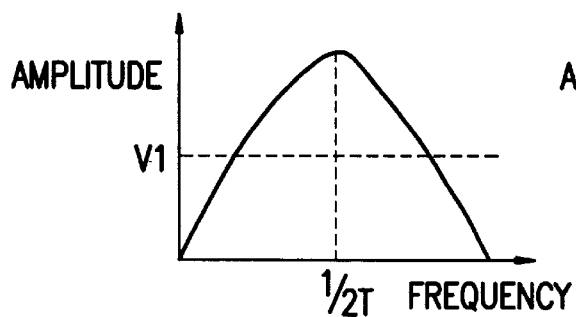
FIGS. 5A–5B show waveforms of the delayed output signals from the reference pattern detection circuit of FIG. 4.

First, the reproduced signal from the low pass filter 4 is delayed by 2 T, through 2 T delay circuit 121. Subtracter 123 subtracts the 2 T delayed signal from the reproduced signal. As a result of the subtraction, the output signal A from the subtracter 123 has the characteristics shown in FIG. 5A. The output signal A is input to the window comparator 125, in which a threshold voltage is set to $+V_1$ and $-V_1$. The values of $+V_1$ and $-V_1$ are selected so that window comparator 125 will output a pulse having a constant period when the reproduced signal from the low pass filter has a frequency of ¼ T (i.e., when the reproduced signal is the reference pattern signal). Accordingly, during the reproduction of the repeating pattern of 2 T, the window comparator 125 outputs a pulse having a constant period, which is supplied to the clock terminal (CLK) of counter 127.

Figure 5B:
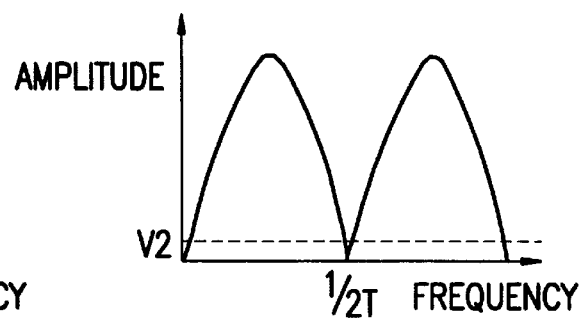

The reproduced signal supplied from the low pass filter 4 that is delayed by 2 T through the 2 T delay circuit 121, is further delayed by another 2 T through the 2 T delay circuit 122. That is, the reproduced signal is delayed by a total of 4 T. Subtracter 124 subtracts the 4 T delayed signal from the reproduced signal obtained through low pass filter 4. As a result, the output signal B from the subtracter 124 has the characteristics shown in FIG. 5B. The output signal B is supplied to the window comparator 126, in which the threshold voltage is set to $+V_2$ and $-V_2$. The values of $+V_2$ and $-V_2$ are selected so that during the reproduction of the repeating pattern having a frequency of ¼ T (i.e., during reproduction of the reference pattern signal), the window comparator 126 will output a signal having a specific level, for example, level "L". Conversely, when signals having another pattern (i.e., having a frequency other than ¼ T) are being reproduced, an "H" level signal is output by the window comparator 126. The output signal from the comparator 126 is supplied to the reset terminal (RESET) of the counter 127.

The counter 127 is reset while the reset terminal is the "H" level. In other words, counter 127 performs the counting action with a signal input through the clock terminal, only when the reference pattern (repeating at a frequency of ¼ T) is being reproduced. When the count value of the counter 127 exceeds a predetermined value ATX, then a timing pulse is generated from the counter 127 for use by the calculation circuit 9.

Currently, with the 1–7 modulation method, the pattern of the VFO area (i.e., reproduction PLL entrance area) also is a repeating pattern of 2 T. Accordingly, the count value at which the counter 127 generates the aforementioned timing pulse is predetermined to be a value that is large enough so that it exceeds the data value of the VFO area. Thus, the counter 127 will output the timing pulse during the reproduction of the data in the reference pattern area 62 or 67.

When decoding the reproduced signal from the low pass filter 4, if a 2 T reiterative pattern should happen to exist in the pattern of ID area 64 or in the pattern of user data area 69, counter 127 may generate a timing pulse in error. To avoid this situation, AM/SYNC detection signals, which are output from the AM/SYNC detection circuit 13 shown in FIG. 1, are supplied to a mask signal generation circuit 128, which generates a mask signal. The mask signal is input to one input terminal of the AND circuit 129 to mask the timing pulse input to the other input terminal of the AND circuit 129 (from the counter 127), thereby preventing the (erroneous) timing pulse from being output to the calculation circuit 9.

Thus, when performing data reproduction based on the partial response method, the reference pattern detection circuit 12 of the invention can detect the reference pattern directly from the reproduced signal obtained from the low pass filter 4. The reference pattern detection circuit 12 then supplies a timing pulse to the calculation circuit 9 accurately, without using a sector mark on the recording medium. This allows the calculation circuit 9 to determine the threshold levels accurately from the signal level output from the A/D converter circuit 6. The threshold levels are then used for decoding the data in the decoder circuit 10. Therefore, sector mark area 60 becomes unnecessary, and can be eliminated from the recording medium 1, thereby increasing the recording capacity for user data.

Means other than the above described reference pattern detection circuit can be provided to detect the reproduction of the data in the reference pattern areas 62 and 67. For example, other circuits that are capable of detecting a 2 T repeating pattern of data can be used. Additionally, circuits (or other means) that detect a characteristic other than a 2 T repeating pattern can be used, particularly when the reference pattern data is provided in a manner in which it does not have a 2 T repeating pattern.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A data reproducing apparatus comprising:
   a PR equalization circuit that equalizes a reproduced signal of user data recorded on a recording medium based on a partial response method;
   an A/D converter circuit that samples an output signal of the PR equalization circuit to produce sample data based on a clock signal produced from the output signal of the PR equalization circuit;
   a decoder circuit that decodes the sample data output from the A/D circuit to generate reproduced data;
   a reference pattern detection circuit that receives the reproduced signal and detects when a reference pattern that is included in the reproduced signal is being reproduced, the reference pattern detection circuit having an output that indicates that the reference pattern is being reproduced; and
   a calculation circuit that determines a plurality of threshold levels based on the output from the reference pattern detection circuit and on the output from the A/D converter circuit, the determined threshold levels being supplied to the decoder circuit for use in decoding the sample data.

2. The apparatus of claim 1, wherein data recorded in the recording medium is partitioned into a plurality of areas, at least one of the plurality of areas being a reference pattern area that contains the reference pattern, and the data in the reference pattern area is the only data in the recording medium that is used by the reference pattern detection circuit to detect the reference pattern.

3. The apparatus of claim 1, wherein the reference pattern detection circuit detects that the reference pattern is being reproduced by detecting whether a characteristic of the reference pattern is present in the reproduced signal, the output of the reference pattern detection circuit indicating that the reference pattern has being reproduced when the characteristic is detected.

4. The apparatus of claim 3, wherein the reference pattern detection circuit includes a mask circuit that generates a mask signal when a portion of the reproduced signal except for a reference pattern area that contains the reference pattern is being reproduced, the output of the reference pattern detection circuit being inhibited from indicating that the reference pattern is present when the mask signal is generated.

5. The apparatus of claim 3, wherein the characteristic is a repeating pattern of data in the reference pattern.

6. The apparatus of claim 5, wherein the repeating pattern of data in the reference pattern repeats at a frequency of ¼ T, where T is a period of the clock signal.

7. The apparatus of claim 1, wherein the reference pattern detection circuit includes a mask circuit that generates a mask signal when a portion of the reproduced signal except for a reference pattern area that contains the reference pattern is being reproduced, the output of the reference pattern detection circuit being inhibited from indicating that the reference pattern is present when the mask signal is generated.

8. The apparatus of claim 1, wherein the reference pattern detection circuit includes:
   a first comparator that outputs a first signal having a constant period when the reference pattern is reproduced;
   a second comparator that outputs a second signal when the reference pattern is reproduced; and
   a counter circuit that receives the first signal as a clock signal and receives the second signal as a reset signal, the counter circuit having an output that indicates that the reference pattern is being reproduced when a count value of the counter circuit exceeds a predetermined value after the second signal has been output by the second comparator.

9. The apparatus of claim 8, wherein the reference pattern detection circuit further includes:
   a first delay circuit that receives the reproduced signal, delays the reproduced signal by a first amount, and outputs a first delayed signal;
   a first subtractor that receives the reproduced signal and the first delayed signal, and outputs a first difference signal to the first comparator;
   a second delay circuit that receives the first delayed signal, delays the first delayed signal by a second amount, and outputs a second delayed signal; and
   a second subtractor that receives the reproduced signal and the second delayed signal, and outputs a second difference signal to the second comparator.

10. The apparatus of claim 9, wherein the first amount and the second amount have the same value.

11. A reference pattern detection circuit for use in a data reproducing apparatus that uses a PR equalization circuit to equalize a reproduced signal of user data recorded on a recording medium based on a partial response method and an A/D converter circuit to sample an output signal of the PR equalization circuit to produce sample data based on a clock signal produced from the output signal of the PR equalization circuit, the reference pattern detection circuit having an input that receives the reproduced signal and an output that indicates when the reference pattern is being reproduced, the reference pattern detection circuit detecting when a reference pattern that is included in the reproduced signal is being reproduced by detecting whether a characteristic of the reference pattern is present in the reproduced signal.

12. The reference pattern detection circuit of claim 11, wherein data recorded in the recording medium is partitioned into a plurality of areas, at least one of the plurality of areas being a reference pattern area that includes the reference pattern, and the data in the reference pattern area is the only data in the recording medium that is used by the reference pattern detection circuit to detect the reference pattern.

13. The reference pattern detection circuit of claim 11, wherein the reference pattern detection circuit includes a mask circuit that generates a mask signal when a portion of the reproduced signal except for a reference pattern area that contains the reference pattern is being reproduced, the output of the reference pattern detection circuit being inhibited from indicating that the reference pattern is present when the mask signal is generated.

14. The reference pattern detection circuit of claim 11, wherein the characteristic is a repeating pattern of data in the reference pattern.

15. The reference pattern detection circuit of claim 14, wherein the repeating pattern of data in the reference pattern repeats at a frequency of ¼ T, where T is a period of the clock signal.

16. The reference pattern detection circuit of claim 11, wherein the reference pattern detection circuit includes:
   a first comparator that outputs a first signal having a constant period when the reference pattern is reproduced;
   a second comparator that outputs a second signal when the reference pattern is reproduced; and
   a counter circuit that receives the first signal as a clock signal and receives the second signal as a reset signal, the counter circuit having an output that indicates that the reference pattern is being reproduced when a count value of the counter circuit exceeds a predetermined value after the second signal has been output by the second comparator.

17. The reference pattern detection circuit of claim 16, wherein the reference pattern detection circuit further includes:
   a first delay circuit that receives the reproduced signal, delays the reproduced signal by a first amount, and outputs a first delayed signal;
   a first subtractor that receives the reproduced signal and the first delayed signal, and outputs a first difference signal to the first comparator;
   a second delay circuit that receives the first delayed signal, delays the first delayed signal by a second amount, and outputs a second delayed signal; and
   a second subtractor that receives the reproduced signal and the second delayed signal, and outputs a second difference signal to the second comparator.

18. The reference pattern detection circuit of claim 17, wherein the first amount and the second amount have the same value.

19. A method of detecting the presence of a reference pattern in a reproduced signal read from a recording medium by a data reproducing apparatus that uses a PR equalization circuit to equalize the reproduced signal based on a partial response method, the method comprising:
   inputting the reproduced signal into a reference pattern detection circuit
   using the reference pattern detection circuit, detecting when the reference pattern is present in the reproduced signal by detecting whether a characteristic of the reference pattern is present in the reproduced signal; and
   outputting a signal from the reference pattern detection circuit that indicates when the reference pattern is present in the reproduced signal.

20. The method of claim 19, wherein the recording medium is a magnetooptical disk.

21. The method of claim 19, wherein the signal is output from the reference pattern detection circuit to a calculation circuit that calculates threshold levels of user data that also is present in the reproduced signal.

22. The method of claim 21, wherein the calculation circuit receives the reproduced signal from an A/D converter circuit that samples an output signal of the PR equalization circuit to produce sample data based on a clock signal produced from the output signal of the PR equalization circuit.

23. The method of claim 22, wherein the calculation circuit outputs the threshold levels to a decoder circuit, and the A/D converter circuit also outputs the sample data to the decoder circuit, and the decoder circuit decodes the sample data output from the A/D circuit, using the threshold levels, to generate reproduced data.

24. The method of claim 19, wherein the data recorded in the recording medium is partitioned into a plurality of areas, at least one of the plurality of areas being a reference pattern area that includes the reference pattern, and the data in the reference pattern area is the only data in the recording medium that is used by the reference pattern detection circuit to detect the reference pattern.

25. The method of claim 19, further comprising generating a mask signal with a mask circuit when a portion of the reproduced signal except for a reference pattern area that contains the reference pattern is being reproduced, and inhibiting the output of the reference pattern detection circuit from indicating that the reference pattern is present when the mask signal is generated.

26. The method of claim 19, wherein the characteristic that is detected is a repeating pattern of data in the reference pattern.

27. The method of claim 26, wherein the repeating pattern of data in the reference pattern repeats at a frequency of ¼ T, where T is a period of a clock signal of the reproduced signal.

* * * * *